US009355608B2

(12) United States Patent
Takahashi et al.

(10) Patent No.: US 9,355,608 B2
(45) Date of Patent: May 31, 2016

(54) ELECTRONIC DEVICE

(75) Inventors: Masaki Takahashi, Kanagawa (JP); Mamoru Yamaguchi, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 175 days.

(21) Appl. No.: 13/609,892

(22) Filed: Sep. 11, 2012

(65) Prior Publication Data

US 2013/0147848 A1 Jun. 13, 2013

(30) Foreign Application Priority Data

Dec. 12, 2011 (JP) ................................. 2011-271727

(51) Int. Cl.
G09G 5/00 (2006.01)
G06F 3/0488 (2013.01)

(52) U.S. Cl.
CPC .............. *G09G 5/00* (2013.01); *G06F 3/04883* (2013.01); *G06F 2203/04806* (2013.01); *G06F 2203/04808* (2013.01); *G09G 2340/045* (2013.01); *G09G 2340/12* (2013.01)

(58) Field of Classification Search
None
See application file for complete search history.

(56) References Cited

U.S. PATENT DOCUMENTS

| | | | | |
|---|---|---|---|---|
| 6,320,599 B1 * | 11/2001 | Sciammarella et al. | ...... | 345/667 |
| 6,643,416 B1 * | 11/2003 | Daniels et al. | ................ | 382/299 |
| 7,768,536 B2 * | 8/2010 | Hyatt | ........................... | 345/660 |
| 8,149,249 B1 * | 4/2012 | Oplinger | ....................... | 345/661 |
| 2002/0112018 A1 | 8/2002 | Kaminagayoshi | | |
| 2008/0049024 A1 * | 2/2008 | Rai et al. | ....................... | 345/473 |
| 2008/0252662 A1 * | 10/2008 | Hyatt | ............................. | 345/660 |
| 2009/0119678 A1 * | 5/2009 | Shih et al. | ..................... | 719/313 |
| 2009/0284478 A1 * | 11/2009 | De la Torre Baltierra et al. | ............................ | 345/173 |
| 2010/0315438 A1 * | 12/2010 | Horodezky et al. | ........... | 345/661 |

FOREIGN PATENT DOCUMENTS

JP 2001-197347 * 7/2001

OTHER PUBLICATIONS

Stackoverflow ("Jquery fullscreen image with borders", Sep. 28, 2011, http://stackoverflow.com/questions/7574330/jquery-fullscreen-image-with-borders).*

The-Art-Of-Web ("CSS: Animation Using CSS Transforms", Feb. 21, 2011, https://web.archive.org/web/20110221151108/http://www.the-art-of-web.com/CSS/css-animation/).*

* cited by examiner

*Primary Examiner* — Kee M Tung
*Assistant Examiner* — Xin Sheng
(74) *Attorney, Agent, or Firm* — Matthew B. Dernier, Esq.

(57) ABSTRACT

A receiving unit acquires a zoom instruction to enlarge or reduce a displayed image. An image processing unit is provided with a function of enlarging or reducing a displayed image in accordance with a zoom instruction. A zoom processing unit can enlarge or reduce a displayed image until the zoom factor of the displayed image reaches the limit. If the zoom factor of a displayed image reaches the limit, the indicator generating unit generates an indicator for notifying a user thereof.

7 Claims, 9 Drawing Sheets

20

20

20

20

20

ELECTRONIC DEVICE

BACKGROUND OF THE INVENTION

1. Field of the Invention

The present invention relates to an electronic device provided with a function of enlarging/reducing a displayed image.

2. Description of the Related Art

Electronic devices such as portable game devices, Personal Digital Assistants (PDAs), or the like have become popular. A number of electronic devices are equipped with a communication function. Further, multi-functional electronic devices such as smart phones, which combine the functions of mobile phones, PDAs, or the like in one device, have come on the market. On such electronic devices, high capacity memory and a high speed processor are installed so as to store content such as taken photos or the like, and to display a content image on a display.

Electronic devices having touch panels provide an excellent user interface that allows a user to operate intuitively. Typical user interfaces include for example, a user interface that displays, as a result of tapping by a finger on a content image in thumbnail, the content image in full size of the panel, or a user interface that scrolls a displayed image as a result of stroking the surface of a panel. In recent years, electronic devices have also come on the market that are provided with a multi-touch screen having a function of detecting a plurality of points touched concurrently, and user interfaces have also been put into practical use that allow a displayed image to be zoomed in (enlarged) or zoomed out (reduced) by a pinch operation by the user.

[PATENT DOCUMENTS No. 1] US Patent Application No. 2002-0112018

For a zoom process, an upper limit and a lower limit of a zoom factor is set sometimes. This is because unlimited zoom-in leads an image so enlarged that an image eventually displayed in full screen cannot be grasped what it is, and because unlimited zoom-out leads to an image so small that the image that is eventually displayed on a screen cannot be seen. Therefore, defining the limits of a zoom factor is effective from a viewpoint of providing a meaningful image.

Meanwhile, if a zoom factor of a displayed image reaches a limit by the pinch operation by the user, the zoom of the displayed image stops at the instant. Since this sudden stop of the zoom process may cause discomfort to users, there is scope for an improvement of some sort.

SUMMARY OF THE INVENTION

In this background, a purpose of the present invention is to provide an improved technology used when stopping a zoom process.

In order to address the aforementioned issue, an electronic device is provided. The electronic device includes: a receiving unit operative to acquire a zoom instruction to enlarge or reduce a displayed image; and an image processing unit operative to enlarge or reduce the displayed image in accordance with the zoom instruction, wherein the image processing unit includes: a zoom processing unit capable of enlarging or reducing the displayed image until the zoom factor of the displayed image reaches a limit; and an indicator generating unit operative, if the zoom factor of the displayed image reaches the limit, to generate an indicator that notifies a user thereof.

Optional combinations of the aforementioned constituting elements, and implementations of the invention in the form of methods, apparatuses, systems, recording mediums, computer programs, or the like may also be practiced as additional modes of the present invention.

DETAILED DESCRIPTION OF THE INVENTION

The invention will now be described by reference to the preferred embodiments. This does not intend to limit the scope of the present invention, but to exemplify the invention.

An electronic device according to the exemplary embodiment is an information terminal device provided with an image processing function for enlarging or reducing a displayed image. For example, the electronic device is a portable game device or a smart phone, and is capable of enlarging or reducing a captured image or an image acquired from a server by installing an image processing application. An image to be zoomed is not limited to a still image but can be a moving image.

An explanation will be given below on the external structure and the circuit configuration of an electronic device according to the exemplary embodiment. Although the electronic device illustrated in the following is a portable game device, the electronic device may be another type of handheld terminal device, or may be a console terminal device.

[Structure of the Front Face]

Figure 1A:
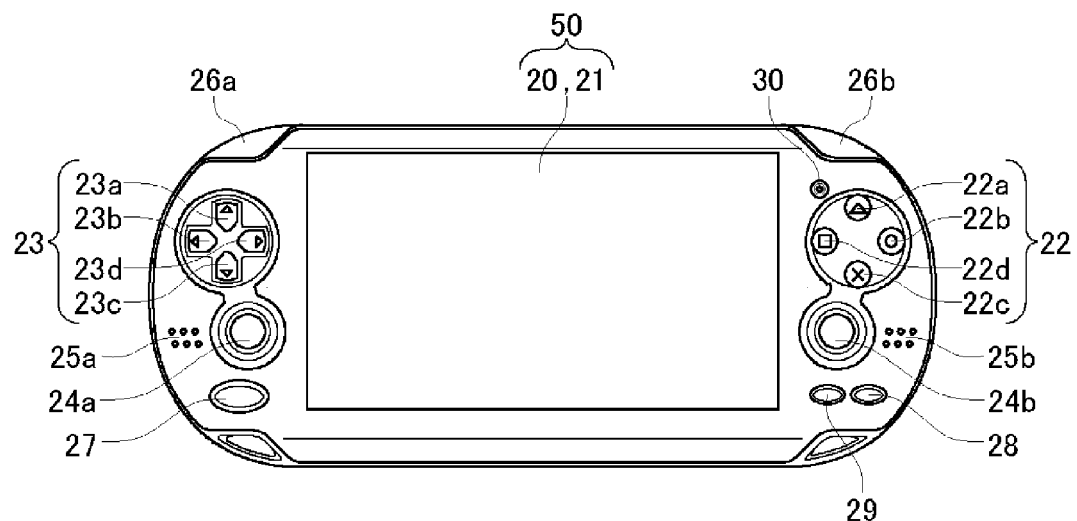
FIG. 1A shows the front of an electronic device and FIG. 1B shows the rear of the electronic device.

FIG. 1A shows the front of the electronic device 10. The electronic device 10 is formed into a horizontally long housing. The right and left sides of the housing, which are held by a user, have an arc-shaped outer surface. On the front surface of the electronic device 10 is provided a rectangular touch panel 50. The touch panel 50 comprises a display device 20 and a front touch pad 21 that is transparent and covers the surface of the display device 20. The display device 20 is an organic Electro-Luminescence (EL) panel having a screen aspect ratio of 16:9, and displays an image. Alternatively, the display device 20 may be a display means such as a liquid crystal panel or the like. The front touch pad 21 is a multi-touch pad having a function of detecting a plurality of points touched concurrently. The touch panel 50 is configured as a multi-touch screen.

At the right of the touch panel 50 are provided a triangle button 22a, a circle button 22b, a cross button 22c, and a square button 22d (hereinafter referred to as "control buttons 22" when referred collectively). The buttons are located at the vertices of a rhombus, respectively. At the left of the touch panel 50 are provided an up key 23a, a left key 23b, a down key 23c, and a right key 23d (hereinafter referred to as "directional keys 23" when referred collectively). A user can input eight directions (up, down, left, and right directions, and diagonal directions) by manipulating the directional keys 23. Below the directional keys 23, a left stick 24a is provided, and below the control buttons 22, a right stick 24b is provided. A user tilts the left stick 24a or the right stick 24b (herein after referred to as "analogue sticks 24" when referred collectively) so as to input the direction and the degree of the tilt. On the upper left and upper right of the housing, an L button 26a and an R button 26b are provided, respectively. The control buttons 22, the directional keys 23, the analogue sticks 24, the L button 26a, and the R button 26b implement manipulation means for user manipulation.

In the vicinity of the control buttons 22, a front camera 30 is provided. At the left of the left stick 24a and at the right of the right stick 24b, a left speaker 25a and a right speaker 25b (herein after referred to as "speakers 25" when referred collectively) that output sound are provided respectively. Further, below the left stick 24a is provided a HOME button 27 and below the right stick 24b are provided a START button 28 and a SELECT button 29.

[Structure of the Rear Face]

Figure 1B:
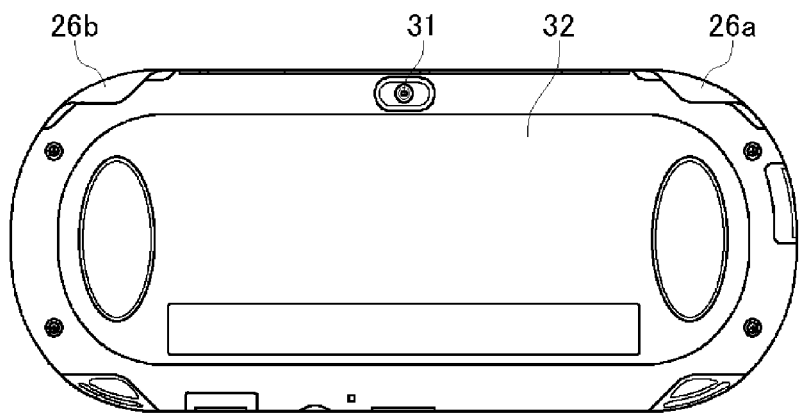

FIG. 1B shows the rear of the electronic device 10. On the rear surface of the electronic device 10, a rear camera 31 and a rear touch pad 32 are provided. In a similar manner as that of the front touch pad 21, the rear touch pad 32 is configured as a multi-touch pad. Two cameras and two touch pads are mounted on the electronic device 10 at the front and rear surfaces.

[Structure of the Top Surface]

Figure 2A:
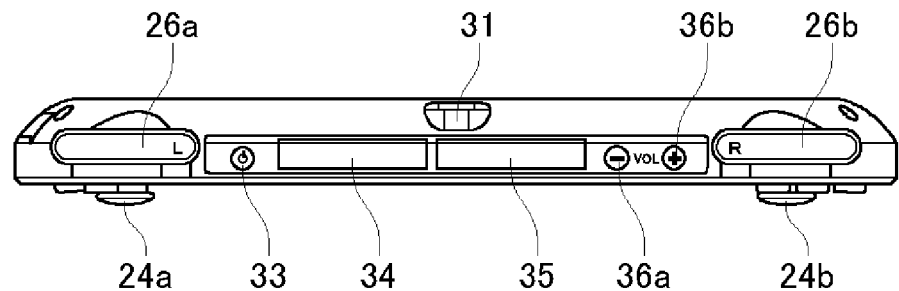
FIG. 2A shows the top view of the electronic device.

FIG. 2A shows the top view of the electronic device 10. As described previously, at the left and right edges of the top surface of the electronic device 10 are provided the L button 26a and the R button 26b, respectively. At the right of the L button 26a, a power button 33 is provided. A user turns the power on or off by pressing the power button 33. The electronic device 10 is provided with a power control function that makes a transition to a suspend state if a time period during which the manipulation means is not operated (non-operation time period) lasts for a predetermined time period. If the electronic device 10 enters the suspend state, a user can return the electronic device 10 from the suspend state to an awake state by pressing the power button 33.

A game card slot 34 is a slot for inserting a game card. FIG. 3A shows the game card slot 34 that is covered by a slot cover. In the vicinity of the game card slot 34, an LED lamp may be provided that blinks when a game card is accessed. An accessory terminal 35 is a terminal for connecting a peripheral device (accessory). FIG. 3A shows the accessory terminal 35 that is covered by a terminal cover. Between the accessory terminal 35 and the R button 26b are provided a minus button 36a and a plus button 36b for adjusting volume.

[Structure of the Bottom Surface]

Figure 2B:
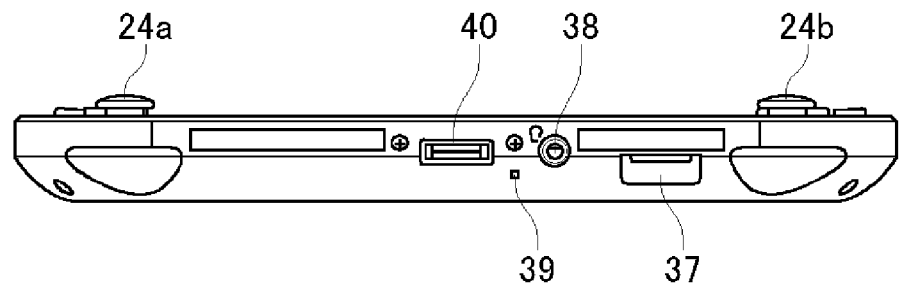
FIG. 2B shows the bottom view of the electronic device.

FIG. 2B shows the bottom view of the electronic device 10. A memory card slot 37 is a slot for inserting a memory card. FIG. 3B shows the memory card slot 37 that is covered by a slot cover. On the bottom surface of the electronic device 10 are provided an audio input and output terminal 38, a microphone 39, and a multi-use terminal 40. The multi-use terminal 40 supports Universal Serial Bus (USB), and can be connected to another device via a USB cable.

[Structure of the Left Side]

Figure 2C:
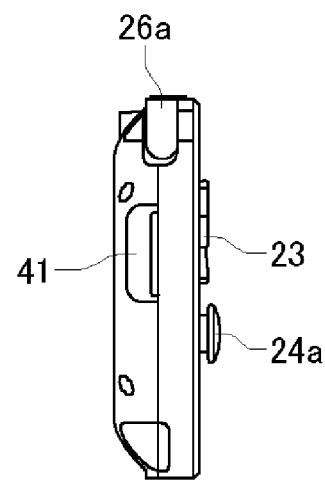
FIG. 2C shows the left side view of the electronic device.

FIG. 2C shows the left side view of the electronic device 10. On the left side face of the electronic device 10 is provided a SIM card slot 41, which is a slot for inserting a SIM card.

[Circuit Configuration of the Electronic Device]

Figure 3:
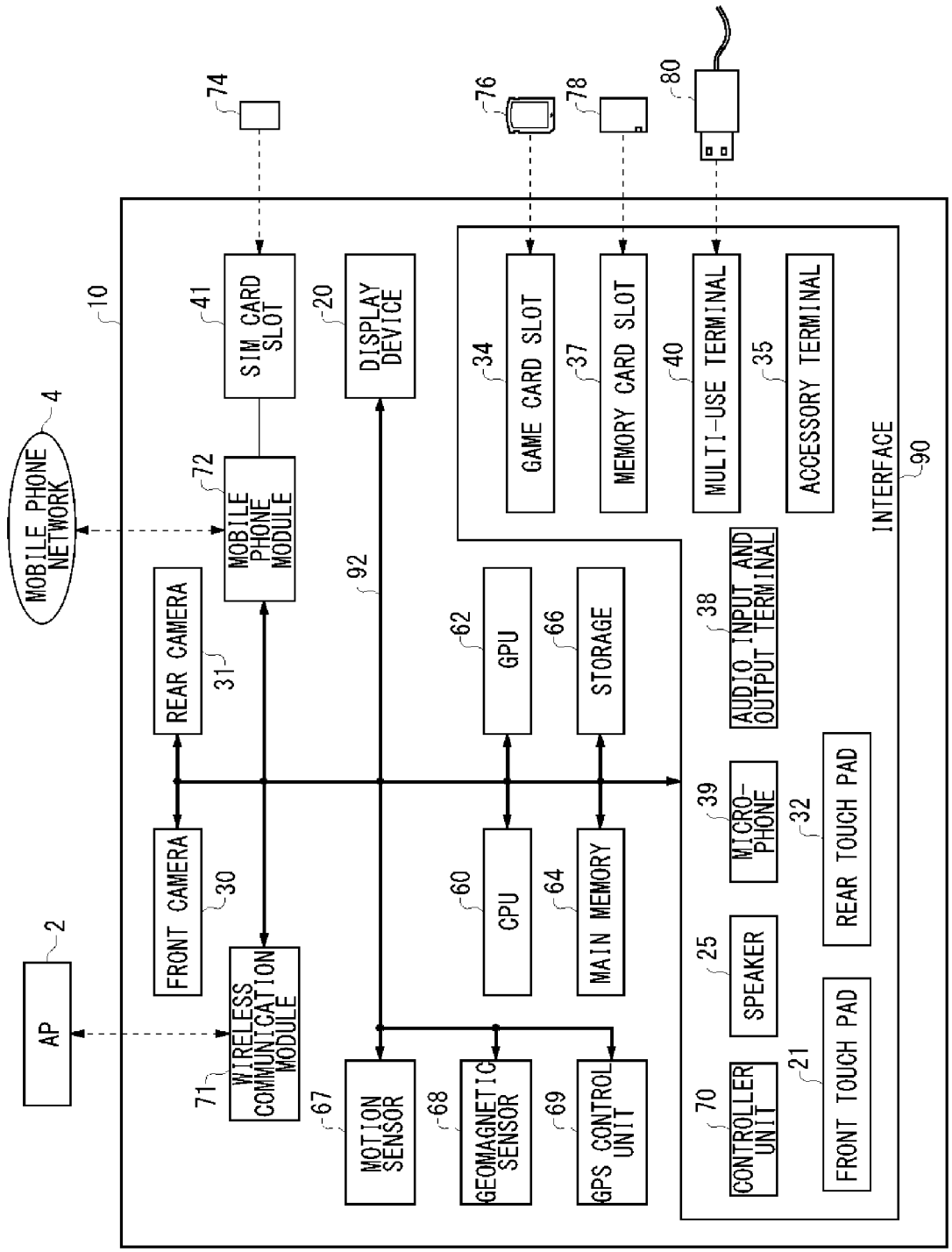
FIG. 3 shows the circuit configuration of the electronic device.

FIG. 3 shows the circuit configuration of the electronic device 10. Respective elements thereof are connected to one another via a bus 92. A wireless communication module 71 comprises a wireless LAN module that complies with a communication standard such as IEEE802.11b/g or the like. The wireless communication module 71 is connected to an external network via an AP2. The wireless communication module 71 may be provided with a Bluetooth (registered trademark) protocol communication function. A mobile phone module 72 supports the 3rd Generation digital mobile phone system that complies with the International Mobile Telecommunication Standard 2000 (IMT-2000) defined by the International Telecommunication Union (ITU). The mobile phone module 72 is connected to a mobile phone network 4. Inserted in the SIM card slot 41 is a SIM card 74, on which unique ID numbers for identifying the telephone number of a mobile phone is stored. As a result of the SIM card 74 being inserted in the SIM card slot 41, the mobile phone module 72 can communicate with the mobile phone network 4.

A Central Processing Unit (CPU) 60 executes a program or the like loaded onto a main memory 64. A Graphics Processing Unit (GPU) 62 performs calculations required for image processing. The main memory 64 is configured with Random Access Memory (RAM) or the like, and stores a program and/or data to be used by the CPU 60. A storage 66 is configured with a NAND-type flash memory or the like, and is utilized as a built-in auxiliary storage device. The display device 20 outputs an image generated by the not limited to a still image but or the like.

A motion sensor 67 detects the movement of the electronic device 10, and a geomagnetic sensor 68 detects earth-geomagnetism in each of the three-axis directions. A GPS control unit 69 receives signals from the GPS satellites and calculates the current position. The front camera 30 and the rear camera 31 capture an image and input the image data thereof. The front camera 30 and the rear camera 31 are configured with a Complementary Metal Oxide Semiconductor (CMOS) image sensor.

In an interface 90, a controller unit 70 includes various manipulation means provided in the electronic device 10. More specifically, the controller unit 70 includes the control buttons 22, the directional keys 23, the analogue sticks 24, the L button 26a, the R button 26b, the HOME button 27, the START button 28, the SELECT button 29, the power button 33, the minus button 36a, and the plus button 36b. The front touch pad 21 and the rear touch pad 32 are a multi-touch pad. The front touch pad 21 is arranged so as to be overlaid on the surface of the display device 20. The speaker 25 outputs sound generated by respective functions of the electronic device 10. The microphone 39 inputs sound from around the electronic device 10. The audio input and output terminal 38 inputs stereo sound from an external microphone and outputs stereo sound to an external headphone or the like.

In the game card slot 34, a game card 76 that stores a game file is inserted. The game card 76 is provided with a storage area where data can be written. If the game card 76 is placed in the game card slot 34, data is written/read by a media drive. In the memory card slot 37, a memory card 78 is inserted. When the memory card 78 is placed into the memory card slot 37, the memory card 78 is utilized as an external auxiliary storage device. The multi-use terminal 40 can be utilized as a USB terminal. The multi-use terminal 40 is connected to a USB cable 80 and transmits data to and receives data from another USB device. To the accessory terminal 35, a peripheral device is connected.

Figure 4:
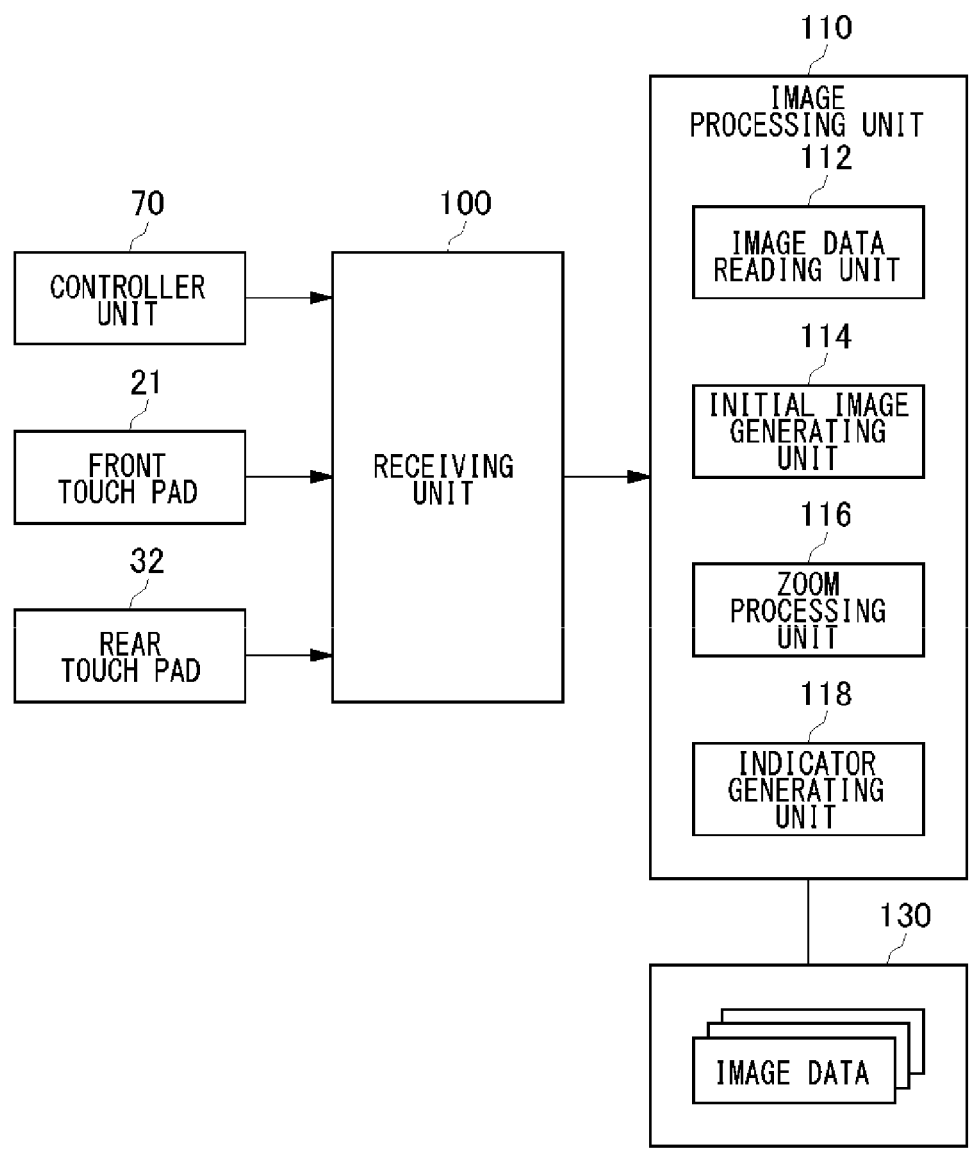
FIG. 4 shows functional blocks of the electronic device.

FIG. 4 shows functional blocks of an electronic device 10 that is provided with an image processing function according to the exemplary embodiment. The electronic device 10 comprises a receiving unit 100, an image processing unit 110, and a storage 130. Those elements are implemented by a CPU of a computer, memory, a program loaded into the memory, or the like in terms of hardware components. FIG. 3 depicts functional blocks implemented by cooperation of these components. Therefore, it will be obvious to those skilled in the art that the functional blocks may be implemented in a variety of ways, by hardware only, software only, or a combination thereof.

The receiving unit 100 receives an operation input by a user via the controller unit 70, the front touch pad 21, and/or the rear touch pad 32. According to the exemplary embodiment, the receiving unit 100 acquires a zoom instruction to enlarge or reduce a displayed image. The image processing unit 110 is provided with a function of scaling up/down a displayed image in accordance with a zoom instruction, and is provided with an image data reading unit 112, an initial image generating unit 114, a zoom processing unit 116, and an indicator generating unit 118. The storage 130 stores image data, and may be for example a memory card 78. Hereinafter, an explanation will be given on an example where the receiving unit 100 acquires a zoom instruction from the front touch pad 21.

In case that a plurality of thumbnail images are displayed on the display device 20, if a user taps on one of the thumbnail images, the front touch pad 21 detects the coordinates of a tapped position, and the receiving unit 100 provides the coordinates of the position to the image processing unit 110. The image data reading unit 112 reads out image data specified by the coordinates of the position from the storage 130, and the initial image generating unit 114 generates an initial image on the basis of the read image data.

Figure 5:
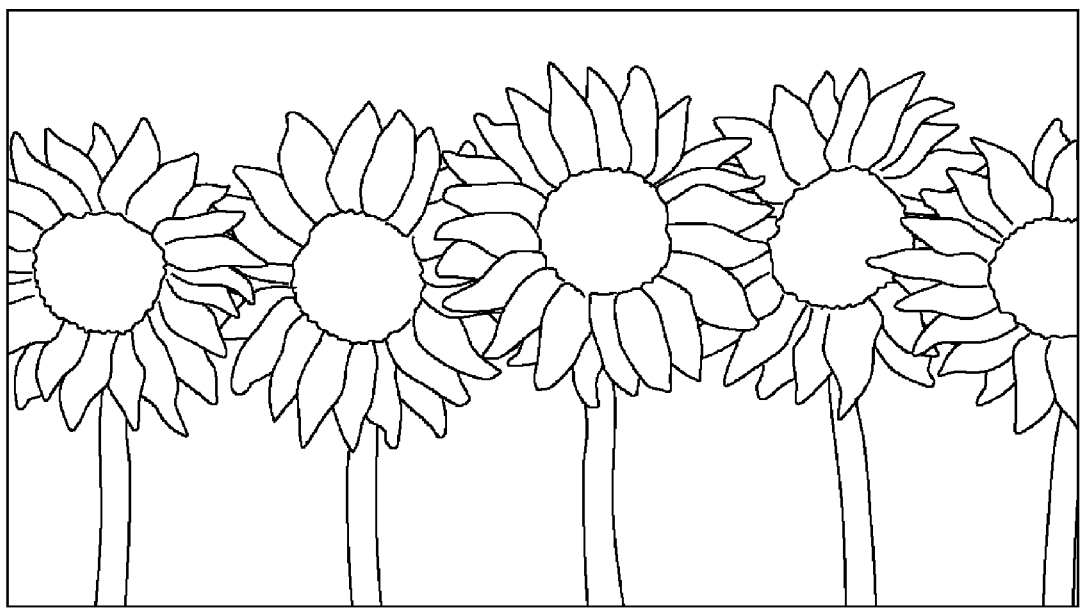
FIG. 5 shows an initial image.

FIG. 5 shows the initial image displayed on the display device 20. The initial image generating unit 114 adjusts the size of the image according to the size of the display device 20 and according to the screen aspect ratio of the display device 20 so that the entire image of the read image data fits into the screen. In this process, the initial image generating unit 114 generates the initial image so that the image is displayed in full size in at least one of the vertical direction or the horizontal direction of the screen. Therefore, in case that the screen aspect ratio (horizontal/vertical ratio) of the display device 20 is 16:9, if the aspect ratio (horizontal/vertical ratio) of the whole image is 16:9, the initial image is displayed in full size of the display device 20. In the same case if the aspect ratio of the entire image is larger than 16:9, the initial image is displayed fully from the left edge to the right edge of the display device 20, meanwhile the upper part or the lower part of the display device 20 is filled in predetermined color (e.g., in black). In the same case if the aspect ratio of the whole image is smaller than 16:9, the initial image is displayed fully from the top edge to the bottom edge of the display device 20, meanwhile the right side or the left side of the display device 20 is filled in predetermined color. In this manner, the initial image generating unit 114 generates an initial image as a maximum entire image on the display device 20.

A user inputs a pinch operation by putting two fingers or a finger and a thumb on the front touch pad 21 that is overlaid on the display device 20, and by changing the distance between the two fingers or between the finger and the thumb. According to the exemplary embodiment, the pinch operation makes a zoom instruction for zooming in (enlarging) a displayed image or zooming out (reducing) the image.

Figure 6A:
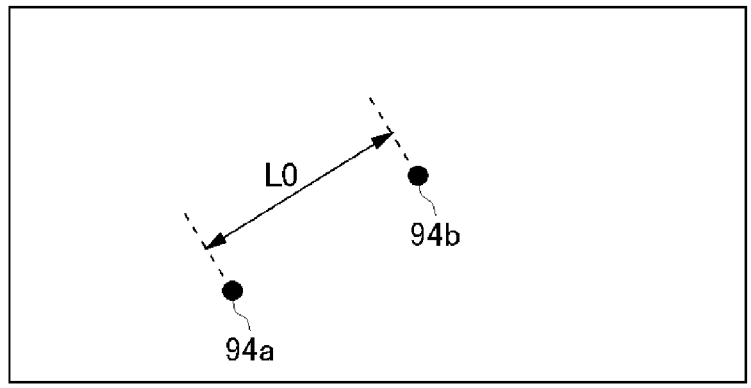
FIGS. 6A-C show diagrams for illustrating a pinch operation.
Figure 6B:
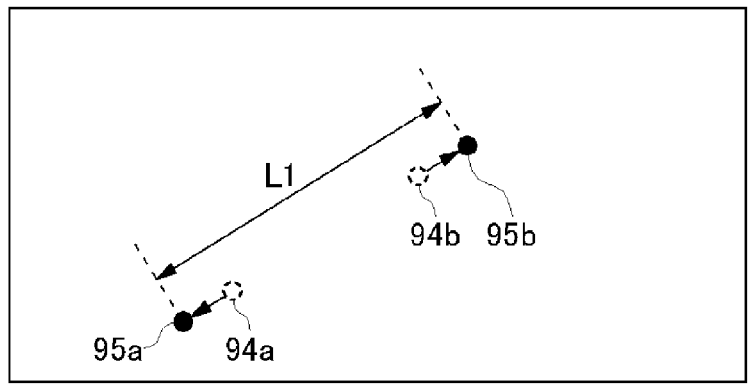
Figure 6C:
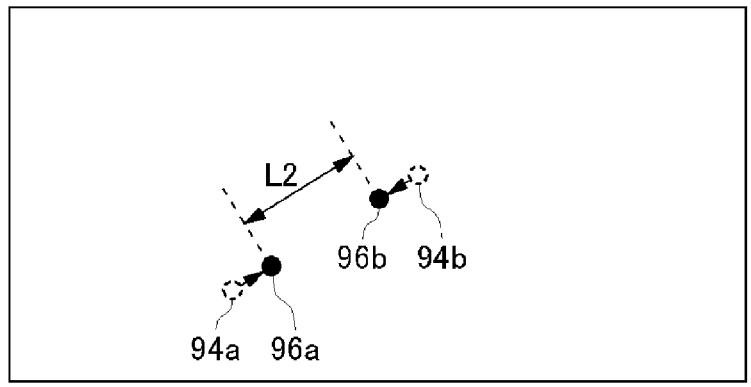

FIGS. 6A-C show diagrams for illustrating the pinch operation. FIG. 6A shows an initial state where two fingers or a finger and a thumb are put on the front touch pad 21. Touch points 94a and 94b indicate initial positions of the two fingers or the finger and the thumb, respectively. When the two fingers or the finger and the thumb touch the front touch pad 21 for the first time, the length L0 between the touch points 94a and 94b is measured. While the two fingers or the finger and the thumb keep touching the front touch pad 21, the distance between the two fingers or the finger and the thumb is measured constantly.

FIG. 6B shows a state where the space between the two fingers or the finger and the thumb is widened from the initial state. Touch points 95a and 95b indicate positions of the two fingers or the finger and the thumb, respectively. The distance between the touch points 95a and 95b is measured as the length of L1. The pinch operation of widening the space between two fingers or a finger and a thumb is called "pinch open (pinch out)," and makes a zoom instruction for zooming in (enlarging) a displayed image.

FIG. 6C shows a state where the space between the two fingers or the finger and the thumb is narrowed from the initial state. Touch points 96a and 96b indicate positions of the two fingers or the finger and the thumb, respectively. The distance between the touch points 96a and 65b is measured as the length of L2. The pinch operation of narrowing the space between two fingers or a finger and a thumb is called "pinch close (pinch in)," and makes a zoom instruction for zooming out (reducing) a displayed image.

In a zooming operation, a length to the length L0 of an initial state is an element that determines the zoom factor of an image to be displayed. That is, in the example shown in FIG. 6B, (L1/L0) is an element that determines the zoom factor, and in the example shown in FIG. 6C, (L2/L0) is an element that determines the zoom factor.

If the front touch pad 21 detects that two fingers or a finger and a thumb touch the pad, the front touch pad 21 provides respective touch points thereof (the coordinates of the positions) to the receiving unit 100. The receiving unit 100 measures the length L0 between the touch points in the initial state, and retains the length L0 as a reference for determining the zoom factor. The receiving unit 100 monitors the length La between the touch points and obtains the value (La/L0) by calculations so as to acquire a zoom instruction. The acquired zoom instruction is passed to the zoom processing unit 116.

The zoom processing unit 116 is provided with a function of enlarging or reducing a displayed image in accordance with a zoom instruction. As described previously, the upper limit and the lower limit are determined for the zoom factor of a displayed image in advance. The zoom factor is defined with reference to the size of an initial image.

<The Lower Limit of a Zoom Factor>

The lower limit of a zoom factor is "1." Therefore, a user can not further reduce an initial image.

<The Upper Limit of a Zoom Factor>

The upper limit of a zoom factor is "4." Therefore, a user can enlarge an initial image up to four times as large as the initial image. The lower limit and the upper limit are intended to be illustrative only and other appropriate values may also be adopted.

The ratio of the upper limit to the lower limit of a zoom factor is "4." Therefore, the maximum enlargement factor when enlarging a displayed image is four, and the maximum reduction factor when reducing a displayed image is four (i.e., the minimum enlargement factor is ¼). For example, assume a case where an enlargement factor is maximized when (La/L0)=1.5, and the enlargement factor is minimized when (La/L0)=0.5. In order to enlarge an initial image four times as large as the initial image, a user sets La=1.5 times L0 or more by a pinch open operation, and in order to reduce the maximum image to the initial image, user sets La=0.5 times L0 or less by a pinch close operation. By such pinch operations, a user can zoom a displayed image in a range between the lower limit and the upper limit.

Although the zoom processing unit 116 can enlarge or reduce a displayed image until the zoom factor of the displayed image reaches a limit (the upper limit or the lower limit) thereof, the zoom processing unit 116 stops the zoom process of the displayed image if the zoom factor reaches the limit thereof.

In the initial image shown in FIG. 5, even if a user makes a pinch close operation, the zoom processing unit 116 does not perform reduction process of the initial image, because the lower limit of the zoom factor is set to "1."

In a state where the initial image shown in FIG. 5 is displayed, a user can input a valid zoom instruction to enlarge the initial image by a pinch open operation. In a state where an enlarged image of the initial image is displayed, a user can input a valid zoom instruction to reduce the image by a pinch close operation.

The indicator generating unit 118 generates an indicator for notifying a user that the zoom factor reaches a limit if the zoom factor of a displayed image reaches the limit and if a zoom instruction to enlarge or reduce the image beyond the limit of the zoom factor is further input by the user. Therefore, in a state where an initial image is displayed, if the receiving unit 100 receives a zoom instruction to reduce and display an image, the indicator generating unit 118 generates an indicator that shows that the zoom factor of the displayed image has reached the limit (lower limit) thereof. In a state where an initial image is enlarged to 400% and displayed, if the receiving unit 100 receives a zoom instruction to enlarge and display an image, the indicator generating unit 118 generates an indicator that shows that the zoom factor of the displayed image has reached the limit (upper limit) thereof. The indicators generated in case that the zoom factor of the displayed image has reached the upper limit or the lower limit may be a common indicator, or may be different indicators.

As an example of the indicator, the indicator generating unit 118 generates a frame surrounding a displayed image and displays the frame on the display device 20. This frame is displayed on the edge of the display device 20 so as not to hinder the displayed image. After the zoom factor reaches the limit thereof, if the receiving unit 100 further receives a zoom instruction in the direction of exceeding the limit of the zoom factor, the indicator generating unit 118 gradually (continuously) broadens the width of the frame up to a predetermined value in accordance with the zoom instruction.

Figure 7:
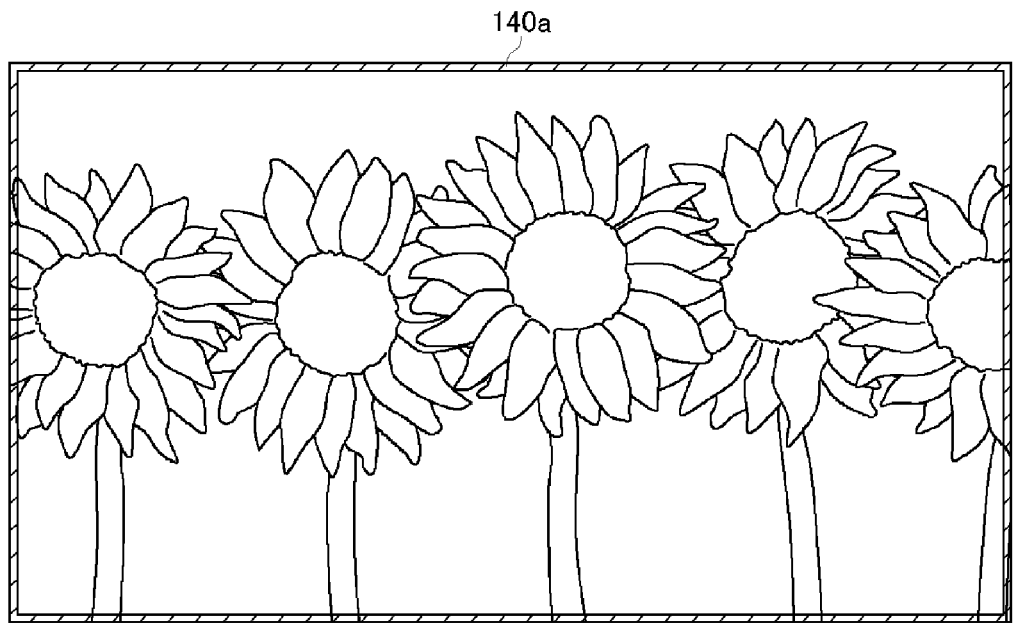
FIG. 7 shows a state where a frame is displayed on the edge of a display.

FIG. 7 shows a state where the indicator generating unit 118 displays a frame on the edge of a display. In a state where an initial image is displayed (i.e., in a state where the zoom factor reaches the lower limit), if the receiving unit 100 receives a zoom instruction to reduce the image, the indicator generating unit 118 displays a frame 140*a* along the edge of the display. The frame 140*a* is preferably translucent or partially translucent so that a user can recognize an image displayed under the frame 140*a*. In this manner, by displaying the frame 140*a* along the edge of the display, the user can recognize that the displayed image can not be reduced further while viewing the displayed image.

Figure 8:
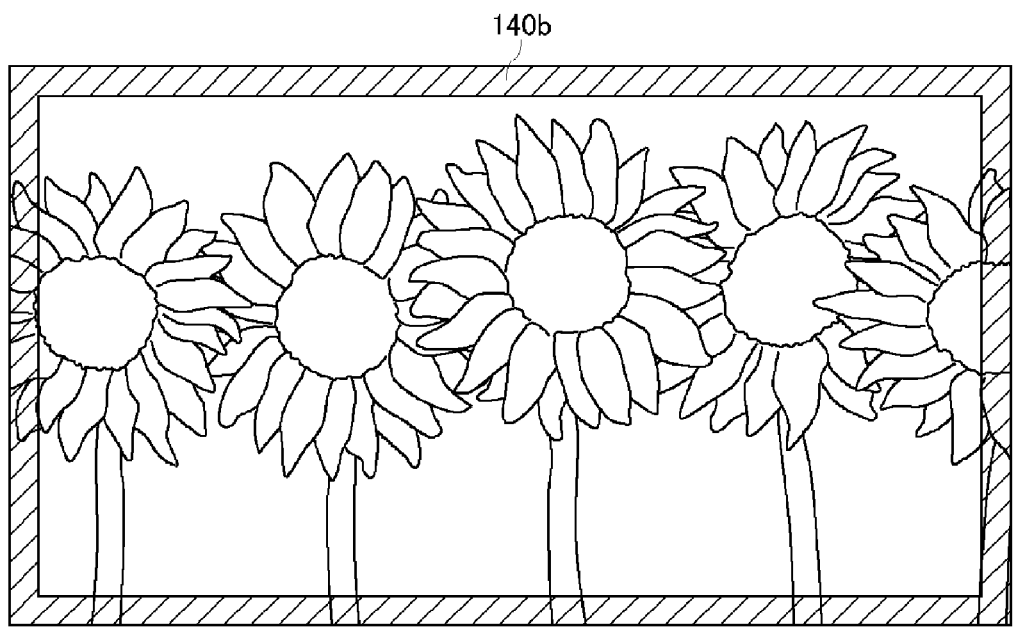
FIG. 8 shows a state where a frame is displayed on the edge of the display.

FIG. 8 shows a state where the indicator generating unit 118 displays a frame on the edge of a display. In the state where the zoom factor has reached the lower limit thereof, if the receiving unit 100 continuously receives a zoom instruction to reduce an image, the indicator generating unit 118 gradually broadens the width of the frame up to a predetermined value. In this context, "to continuously receive a zoom instruction" means to receive a zoom instruction to reduce an image for a plurality of times consecutively. FIG. 8 shows a state where the frame 140*b* is broadened up to the maximum width. By broadening the width of the frame in accordance with the zoom instruction, a user can readily recognize the existence of the frame. Thus, the frame can show the user that a displayed image can not be reduced further. In addition, by allowing the width of the frame to follow the movement of fingers or a finger and a thumb of a user, a user interface can be implemented that fits intuitive feel of the user when the user makes an operation. Once the width of the frame 140*b* reaches its maximum, the width of the frame 140*b* does not change thereafter even if the receiving unit 100 receives a zoom instruction.

Figure 9:
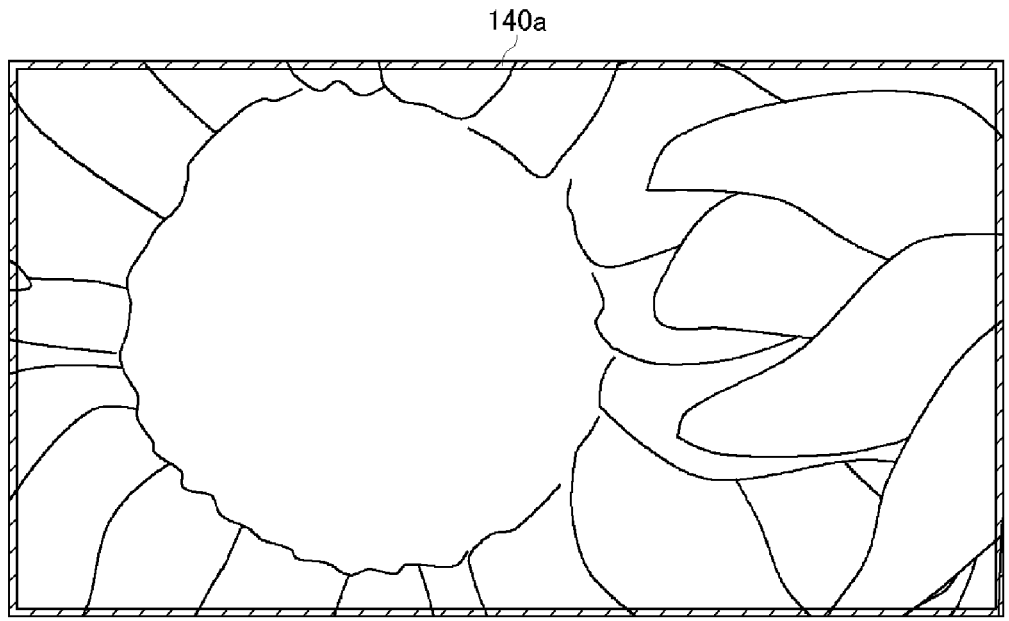
FIG. 9 shows a state where a frame is displayed on the edge of the display.

FIG. 9 shows a state where the indicator generating unit 118 displays a frame on the edge of a display. In a state where an initial image is enlarged by 400 percent (i.e., in a state where the zoom factor reaches the upper limit), if the receiving unit 100 receives a zoom instruction to enlarge the image, the indicator generating unit 118 displays a frame 140*a* along the edge of the display.

Figure 10:
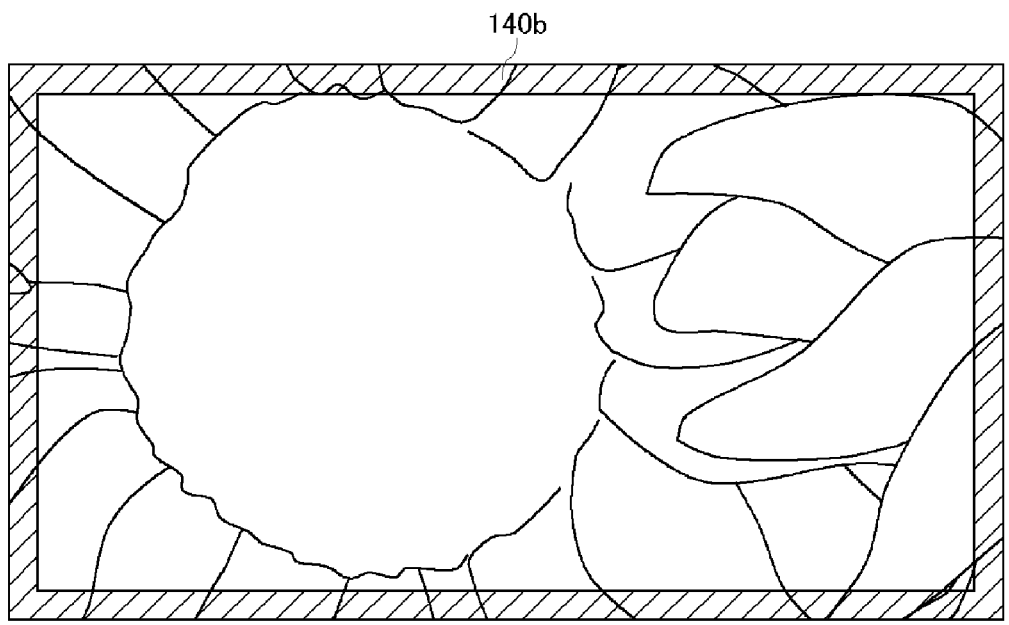
FIG. 10 shows a state where a frame is displayed on the edge of the display.

FIG. 10 shows a state where the indicator generating unit 118 displays a frame on the edge of a display. In the state where the zoom factor has reached the upper limit thereof, if the receiving unit 100 continuously receives a zoom instruction to enlarge an image, the indicator generating unit 118 gradually broadens the width of the frame up to a predetermined value. FIG. 10 shows a state where the frame 140*b* is broadened up to the maximum width. By broadening the width of the frame in accordance with a zoom instruction, a user can readily recognize the existence of the frame. Thus, the frame can show the user that a displayed image can not be enlarged further. Once the width of the frame 140*b* reaches its maximum, the width of the frame 140*b* does not change thereafter even if the receiving unit 100 receives a zoom instruction. In this manner, in a state where the zoom factor reaches the lower limit or the upper limit thereof, if a user inputs a further zoom instruction, the zoom processing unit 116 stops the zoom process and the indicator generating unit 118 generates an indicator. Thereby, the user can intuitively recognize that no further zoom operation is allowed.

The frame 140 is formed in predetermined color (e.g., in white) and is preferably configured so that a user can see an image displayed under the frame. The frame 140 may have a gradation pattern that varies gradually from low brightness at the edge of the display to high brightness at the inner side of the display.

In response to a further zoom instruction after the zoom factor reaches the limit, the indicator generating unit 118 gradually broadens the frame 140, and increases the brightness level so that the frame becomes noticeable gradually. Thereby, a user can readily recognize that the zoom factor has reached the limit.

Although in the example described above, the indicator generating unit 118 displays the frame 140 on the edge of a display as an indicator, the indicator generating unit 118 may display the frame 140 on the edge of a displayed image. The indicator generating unit 118 may also display a predetermined message as an indicator by overlaying the message on the displayed image. For example, the indicator generating unit 118 may display a message "the image can not be reduced anymore" in case that the zoom factor has reached the lower limit, and may display the message gradually in a larger size if a zoom instruction to reduce the image is input further. The indicator generating unit 118 may also adopt as an indicator a display mode where the screen image is dimmed.

Figure 11:
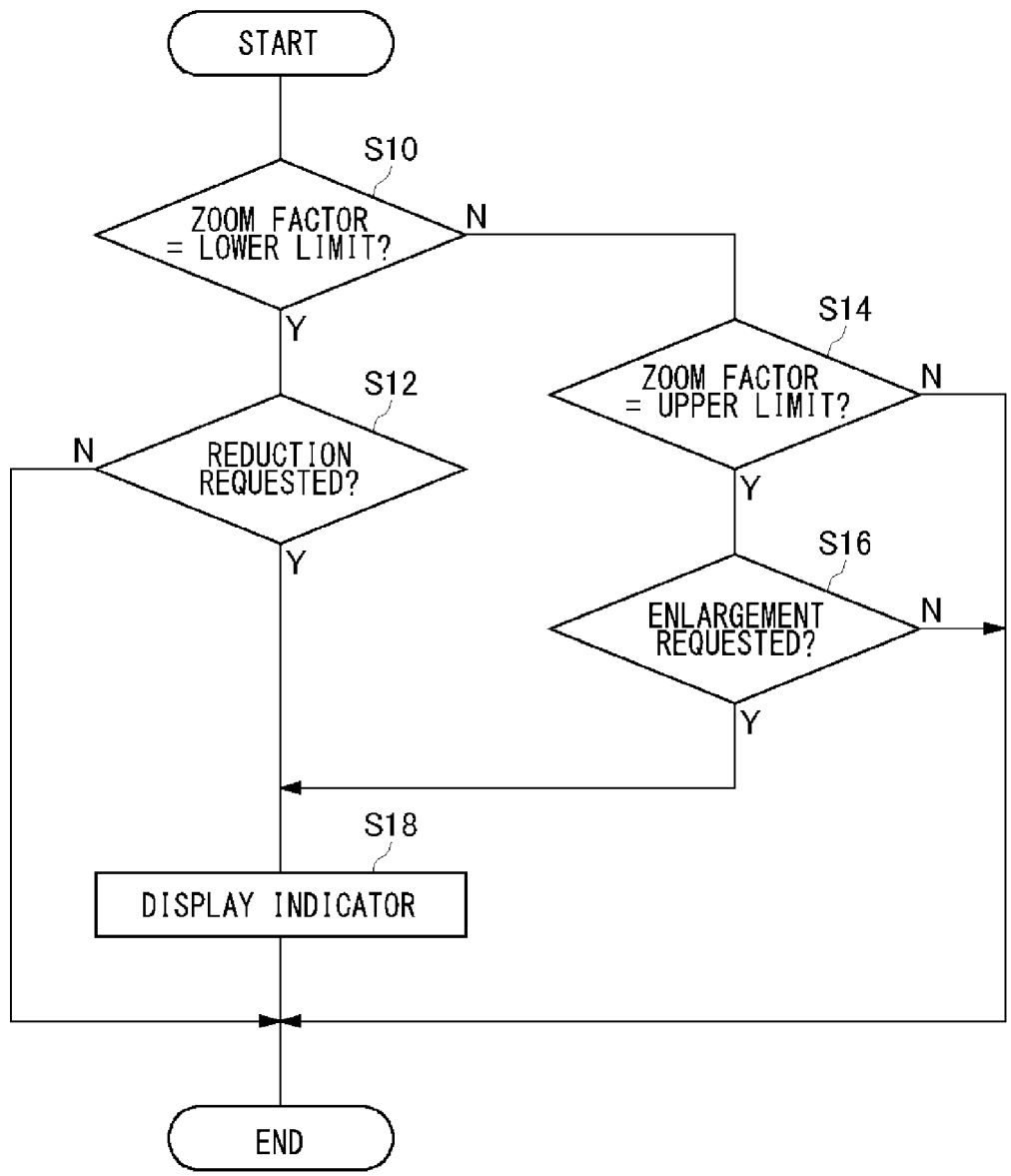
FIG. 11 shows a flowchart of an indicator display process.

FIG. 11 shows a flowchart of an indicator display process. In case that the zoom factor of a displayed image has reached the lower limit (Y in S10), if the receiving unit 100 receives an instruction to reduce the displayed image (Y in S12), the indicator generating unit 118 generates an indicator that shows a user that the zoom factor of the displayed image has reached the limit thereof (S18). On the other hand, if the receiving unit 100 does not receive an instruction to reduce the displayed image (N in S12), the indicator generating unit 118 does not generate an indicator.

In case that the zoom factor of a displayed image is larger than the lower limit (N in S10) and the zoom factor has reached the upper limit (Y in S14), if the receiving unit 100 receives an instruction to enlarge the displayed image (Y in S16), the indicator generating unit 118 generates an indicator that shows the user that the zoom factor of the displayed image has reached the limit thereof (S18). On the other hand, if the receiving unit 100 does not receive an instruction to enlarge the displayed image (N in S16), the indicator generating unit 118 does not generate an indicator. If the zoom factor is within a range larger than the lower limit and smaller than the upper limit (N in S14), the zoom processing unit 116 generates an image to be displayed in accordance with the zoom factor. In this case, since the zoom factor is in an appropriate range, the indicator generating unit 118 does not generate an indicator.

Given above is an explanation based on the exemplary embodiment. This embodiment is intended to be illustrative only and it will be obvious to those skilled in the art that various modifications to constituting elements and processes could be developed and that such modifications are also within the scope of the present invention.

According to the exemplary embodiment, a user inputs a zoom instruction by a pinch operation. However, for example in case that a function of adjusting the size of a displayed image is allocated to the analogue stick 24, a user may input a zoom instruction by tilting the analogue stick 24. In this manner, a zoom instruction for a displayed image may be input by any means.

With regard to FIG. 6, the zoom factor is determined by using (La/L0) where the length L0 is defined as a distance between the touch points in the initial state, and the length La is defined as a distance between the touch points after the move of the touch points according to the exemplary embodiment. In a variation thereof, the zoom factor may be determined by using (La−L0), which is a difference between La and L0. If the (La−L0) is a positive value, the absolute value of the difference may be used as a parameter for determining the zoom factor for scaling up and the zoom factor may be determined accordingly. If the (La−L0) is a negative value, the absolute value of the difference may be used as a parameter for determining the zoom factor for scaling down and the zoom factor may be determined accordingly.

According to the exemplary embodiment, the zoom factor is defined by using the size of an initial image as a reference. As described previously, the size of the initial image is adjusted so that the entire image of image data fits into the screen. In a variation of the embodiment, the zoom factor may be defined by using the resolution (the number of pixels along the horizontal and vertical sides) of image data as a reference, that is, by using the size of an original image as a reference. Even in this case, the lower limit and the upper limit of the zoom factor is defined in a similar manner but by using the size of the original image as a reference. In this way, the zoom factor may be defined by using any image size as a reference, as far as the lower limit and the upper limit of the zoom factor are defined for the reference.

According to the exemplary embodiment, if the zoom factor reaches the limit thereof, the zoom processing unit 116 stops the zoom process of the displayed image, and if the receiving unit 100 further receives a zoom instruction in the direction of exceeding the limit of the zoom factor, the indicator generating unit 118 generates an indicator. In a variation of the embodiment, the limits of the zoom factor is defined for an image displayed when no pinch operation is received, and in case that the receiving unit 100 receives a zoom instruction in the direction of exceeding the limit of the zoom factor, the zoom processing unit 116 may continue a zoom process for the displayed image in accordance with the zoom factor that exceeds the limit. Also in this variation, the indicator generating unit 118 generates an indicator in a similar manner. In this case, if the pinch operation by the user is completed, the zoom processing unit 116 displays the image that has been displayed with the upper limit or lower limit zoom factor. Therefore, if the pinch operation is completed, the image that has been displayed with a zoom factor exceeding the upper limit or exceeding the lower limit is displayed with the upper limit or lower limit zoom factor.

According to the exemplary embodiment an explanation has been given on the case where the indicator generating unit 118 displays the frame 140 in a translucent or partially translucent manner. For example, the indicator generating unit 118 may alpha-blend the frame 140 and a displayed image. "rate"=(La/L0) is calculated where the length L0 is defined as a distance between the touch points in the initial state, and the length La is defined as a distance between the touch points after the move of the touch points. The opacity of the frame 140 is set as $\alpha$ % and the opacity of the displayed image is set as (100−$\alpha$) %.

An explanation will be given in the following on a method for deriving $\alpha$ in two cases.

(1) In case that an instruction for scaling down with the zoom factor that exceeds the lower limit is input, $$R=(1.0-\text{rate})+\beta \text{ (e.g., } \beta=0.3).$$

In case of R>1, R is set to R=1.

In this manner, R is derived from "rate", and $\alpha$ is calculated while setting $\alpha$=R. By calculating $\alpha$ in this manner, $\alpha$ becomes larger as a reduction rate becomes larger (enlargement rate becomes smaller) with a zoom factor exceeding the lower limit, thus the opacity of the frame 140 becomes higher.

(2) Assume a case that an instruction for scaling up with the zoom factor that exceeds the upper limit is input, where the screen diagonal of the display device 20 is set to Lmax. In this case, $$R=(\text{rate}-1.0)\text{times}(La/L\text{max}).$$

In case of R>1, R is set to R=1.

In this manner, R is derived from "rate", and $\alpha$ is calculated while setting $\alpha$=R.

By calculating $\alpha$ in this manner, $\alpha$ becomes larger as the enlargement rate becomes larger with a zoom factor exceeding the upper limit, thus the opacity of the frame 140 becomes higher.

By performing an alpha blending process in the manner described above, in case that a further zoom instruction that exceeds the limit of the zoom factor is input, by thickening the color of the frame 140 (i.e., by increasing the opacity caused by the frame 140) gradually, a user can recognize the change in colors, and the user can readily recognize that the displayed image reaches a zoom limit.

What is claimed is:

1. An electronic device comprising:
    a receiving unit operative to acquire a zoom instruction to continuously enlarge or reduce a displayed image; and
    an image processing unit operative to continuously enlarge or reduce the displayed image in accordance with the zoom instruction,
    wherein the image processing unit comprises:
    a zoom processing unit capable of executing the instruction to continuously enlarge or reduce the displayed image from an initial zoom factor, consecutively through one or more larger or smaller zoom factors, until the zoom factor of the displayed image reaches a zoom factor limit; and
    an indicator generating unit operative, if the zoom factor of the displayed image reaches the limit as a result of the execution of the instruction and the instruction includes an instruction to continuously enlarge or reduce the image beyond the limit, to generate an indicator that notifies a user thereof that the zoom factor has reached the limit; wherein
    during the notification, the indicator gradually obscures at least a portion of the image, at least one aspect of the indicator gradually increases in at least one of size and brightness, and the image maintains a same zoom factor.

2. The electronic device according to claim 1, wherein the indicator generating unit displays a frame that surrounds the displayed image.

3. The electronic device according to claim 2, wherein the indicator generating unit displays the frame on the edge of a display.

4. The electronic device according to claim 2, wherein the indicator generating unit gradually broadens the width of the frame up to a predetermined value in accordance with the zoom instruction.

5. The electronic device according to claim 2, wherein the indicator generating unit generates the frame that is translucent or partially translucent.

6. A non-transitory computer-readable recording medium encoded with a program comprising:
    a module configured to acquire a zoom instruction from a user;
    a module configured to continuously enlarge or reduce a displayed image, in accordance with the zoom instruction, from an initial zoom factor, consecutively through one or more larger or smaller zoom factors; and
    a module configured, if the zoom factor of the displayed image reaches a zoom factor limit as a result of the execution of the instruction and the instruction includes an instruction to continuously enlarge or reduce the image beyond the limit, to generate an indicator that notifies a user thereof that the zoom factor has reached the limit, wherein
    during the notification, the indicator gradually obscures at least a portion of the image, at least one aspect of the indicator gradually increases in at least one of size and brightness, and the image maintains a same zoom factor.

7. An apparatus comprising a microprocessor operating under the control of a computer program to implement a method comprising:
    acquiring a zoom instruction from a user;
    continuously enlarging or reducing a displayed image, in accordance with the zoom instruction, from an initial zoom factor, consecutively through one or more larger or smaller zoom factors; and
    if the zoom factor of the displayed image reaches a zoom factor limit as a result of the execution of the instruction and the instruction includes an instruction to continuously enlarge or reduce the image beyond the limit, generating an indicator that notifies a user thereof that the zoom factor has reached the limit, wherein
    during the notification, the indicator gradually obscures at least a portion of the image, at least one aspect of the indicator gradually increases in at least one of size and brightness, and the image maintains a same zoom factor.

* * * * *